United States Patent [19]

Knirsch et al.

[11] Patent Number: 4,687,701

[45] Date of Patent: Aug. 18, 1987

[54] HEAT SENSITIVE INKED ELEMENT FOR HIGH SPEED THERMAL PRINTERS

[75] Inventors: Franco Knirsch, Banchette; Giovanni Gianolini, Lozza, both of Italy

[73] Assignee: Ing. C. Olivetti & C., S.p.A., Italy

[21] Appl. No.: 594,273

[22] Filed: Mar. 28, 1984

[30] Foreign Application Priority Data

Mar. 30, 1983 [IT] Italy .............................. 67352 A/83

[51] Int. Cl.[4] ........................... B32B 7/02; C09J 7/02

[52] U.S. Cl. .................................... 428/216; 400/120; 400/241.1; 428/347; 428/348; 428/349; 428/488.1; 428/913; 428/914

[58] Field of Search ..................... 428/488.1, 913, 214, 428/216, 215, 348, 914, 349, 347; 106/22, 23; 400/241.1, 120; 219/216

[56] References Cited

U.S. PATENT DOCUMENTS

| | | | |
|---|---|---|---|
| 3,944,695 | 3/1976 | Kosaka et al. | 428/488.1 X |
| 3,989,131 | 11/1976 | Knirsch et al. | 400/120 |
| 4,461,586 | 7/1984 | Kawanishi et al. | 428/488.1 X |
| 4,465,389 | 8/1984 | Knirsch et al. | 400/241.1 |
| 4,474,844 | 10/1984 | Omori et al. | 428/488.1 X |

FOREIGN PATENT DOCUMENTS

| | | | |
|---|---|---|---|
| 0033364 | 12/1981 | European Pat. Off. | 400/241.1 |
| 0076044 | 6/1983 | European Pat. Off. | 400/241.1 |
| 1192920 | 5/1970 | United Kingdom | 106/22 |
| 2010515 | 6/1979 | United Kingdom | 400/241.1 |
| 2069160 | 8/1981 | United Kingdom | 428/913 |

*Primary Examiner*—Thomas J. Herbert
*Attorney, Agent, or Firm*—Banner, Birch, McKie & Beckett

[57] ABSTRACT

The inked element which is preferably in ribbon form comprises a flexible plastics carrier of a thickness of from 5 to 15$\mu$, covered with a thermotransferable coating which is 2 to 6$\mu$ in thickeness. The mixture of the coating comprises a blend of thermoplastic resins of non-polymeric type with natural or synthetic waxes with a melting point of between 60° and 80° C. The waxes and the resins are so selected as to be compatible with each other and to provide a melting point of between 60° and 80° C. and a melt viscosity of between 50 to 1000 cps. The ribbon makes it possible to print at a printing rate of 40 to 120 characters/sec on papers having a Bendtsen roughness of 10 to 100 ml/min. The ribbon can be prepared with bands of different colors for multi-color printing.

7 Claims, No Drawings

HEAT SENSITIVE INKED ELEMENT FOR HIGH SPEED THERMAL PRINTERS

BACKGROUND OF THE INVENTION

The present invention relates to a heat-sensitive inked element for high-speed printers, comprising a plastics material base carrier covered on one side with a coating of a mixture which is transferable to a printing carrier when it is subjected to heat and pressure, the mixture comprising a pigment and/or colouring agent and a binder formed by a blend of thermoplastic resins and natural or synthetic waxes with a melting point of between 60° and 80° C.

Various inked elements in the form of single-use ribbons are known. In a known ribbon, the resin requires a high melting temperature and is accordingly relatively rigid and fragile at room temperature, whereby it has a tendency to crack.

To overcome that disadvantage, a ribbon has already been proposed, in which the mixture comprises a polymeric resin and a plasticising agent to increase adhesion to the paper, but, because of the viscosity in the molten state, it does not permit a high printing rate.

SUMMARY OF THE INVENTION

The object of the present invention is to provide an inked element of the above-indicated type, which is suitable for high-speed printing.

The inked element according to the invention is characterised in that the resins are of non-polymeric type and the waxes and resins are so selected as to be compatible with each other and to produce a melting point of between 60° and 80° C. and a melt viscosity of between 50 and 1000 cps.

These and other features of the invention will be more clearly apparent from the following description of some preferred embodiments which are given by way of non-limiting example.

DESCRIPTION OF THE PREFERRED EMBODIMENT

The ribbon comprises a thermoplastic material base carrier which is covered on one side by a thin layer of solid ink which is thermotransferable to a printing carrier of paper and/or thermoplastic nature. The printing process provides for the simultaneous application of pressure and heat by means of the printing head to the inked ribbon, to produce the effect of transfering the ink from the ribbon to the printing carrier.

The ribbon must permit printing at a high printing rate, with a medium quality of printing, in terms of good character definition, sufficient resistance to rubbing and good penetration into the fibres of the paper carrier, with limited surface roughness. It is prepared in various forms, in black or in colours, and is generally used in high-speed printers and/or digital copiers of B/W and colour type, for example of the type described in our U.S. patent application Ser. No. 577,341, filed on Feb. 6, 1984, entitled 'Method and Apparatus for Reproducing Colour Images'.

The inking mixture comprises a binder of non-polymeric type which accordingly, when heated, melts and flows rapidly from the carrier to the paper, penetrating into the fibres of the paper. The binder is so formulated as to give a low melting point, for example 60° to 80° C., and a melt viscosity of 50 to 1000 cps. The ribbon is produced by spreading an inking mixture or ink over a carrier comprising mylar, kapton, polythene, or capacitor paper, from 5 to 15μ in thickness. The spreading is effected in a machine with a spreading station in which the carrier receives the ink in the form of a thin layer of 15 to 30μ in thickness, which, after drying, becomes solid and adheres to the substrate in a thickness of from 2 to 6μ. The ribbon can also be prepared by spreading the mixture in bands of alternate colours for 3-colour printing, for example of the type described in the applicants' above-identified patent application.

The ribbon when prepared in this manner makes it possible to print with heads with a vertical row of printing elements and with a definition of eight to ten dot/mm at high printing rates (40–120 characters/sec), with good quality of printing, over a range of papers with roughness of 10 to 100 mil/min.

For that reason, the roughness of a wide range of office papers which are available on the market was measured using an instrument from Bendtsen & Wattre (Stockholm), using the Scan-Test Standard Method Scan-P 21:67 procedure.

The results obtained fall in a range of values of from 10 to 100 ml/min.

The binder consists of a mixture of natural or synthetic waxes with a melting point of from 60° to 80° C., and microcrystalline and synthetic paraffins prepared according to the Fischer-Tropsch process, with a melting point of from 60° to 70° C., with particular non-polymeric resins of the colophonies, modified colphonies, hydrocarbons and modified rosins type.

The following were found to be particularly attractive, among the various waxes tried: beeswax, Japan wax, having melting points of 60° to 65° C., microcrystalline paraffinic wax such as Paraffin Wax (manufactured by Pergamon Wax), S 45 Wax (trademark of S.P.A. Tillmans), Micro 60/63 Wax (trademark of Spica S.P.A.) having melting points of from 60° to 65° C., esterified and partially esterified waxes with a melting point of between 70° and 80° C. of the Hostalub We 4, Hostalub WE2, trademarks of Hostalub TMWE 14 (Hoechst) type, synthetic waxes of the type of fatty acid esters with glycerin, glycols or higher alcohols, fatty acid amides and stearic and oleic amines, the hydrogenated tallow amines commercialized as Armeen 2HT and the H-tallow amineacetate commercialized as Armac HT (trademarks of Akzo-Chemie).

The resins considered must satisfy certain requirements such as perfect compatibility with the waxes, low melting point and a high level of fluidity in the molten state. The following commercially available rosin based resins gave optimum results: Unirez 221, Unirez 6012, Unirez 3300, Unitol NCY (trademarks of Union-Camp Corp.), the synthetic rosin ester 12 B 715 (manufactured by Lawter Chemicals N.V.), the colophane based resins having a melting point of between 68° and 80° C. such as Colophane-Dismutée, Dertomal 4, Dertoline S.G (trademarks of Derives Resiniques Et Terpeniques), Resinall 585 (trademark of Carolina Processing Co) and alicyclic H-saturation trademark of National Ink Co.).

The formulation of the ink requires perfect compatibility of the two main components (resins and wax) in various ratios for the purposes of having an appropriate melting point (MP) and suitable fluidity in the molten state. Added to that mixture is a colouring agent and/or pigment to produce a black or coloured ink. Having regard to the particular nature of the basic components of the ink, wax and resin, the colour must be suitably selected in order to satisfy the requirements in regard to compatibility with the binder, stability with respect to light, temperature and the ambient air.

The selection in respect of the colouring agent or pigment of complementary colour, cyan, magenta and yellow, to prepare a ribbon which is envisaged for use in printers or copiers for producing colour printing, must take account of the shade of the colour required for producing colour printing in three colours.

The most significant colours are Sandorin 2 GLS Blue, Graftolo BP Ruby, Graftolo GXS Yellow, Graftolo WTP Ruby, Sandorin 5 BL Brilliant Red (trademarks of Sandoz) and Fat Black HT (trademark of Hoechst).

In the case of an inked element which is produced by sequentially coating the inks which are coloured with the colouring agents or pigments, cyan, magenta and yellow, over carriers comprising mylar, kapton, etc., it is possible to produce a ribbon for use in colour printers and copiers, which print by superpositioning of the cyan, magenta and yellow in successive printing steps. By varying the composition of the thermotransferable coating and the thickness of the carrier, it is possible to transfer the coating and thus to produce the printing by applying an energy of from 1 to 10 Joule/cm$^2$, with any type of thermal head which is known in the art.

Such characteristics in respect of the ribbon permit normal speeds of feed movement of the head or the sheet of paper of up to 20 cm/sec. In the case of parallel heads, it is therefore possible to achieve a theoretical printing rate of up to 30 pages per minute. In practice however, that potential on the part of the ribbon is conditioned by the known limitations with the thermal inertia of the head, the power of the power supply available, and the mechanics of the process. For that reason optimised planning and projection of those components could make it possible to achieve printing rates which are comparable to those of xerographic copiers.

In the case of three-colour printing, the printing rates are reduced by a factor of 3 or 4 by virtue of the fact that three or four printing passes with the printing head are required.

As already stated, the composition and choice of the carrier for the ribbon may be optimised and adapted in dependence on the type of head used, insofar as each type of head requires a ribbon with specific features.

In particular, in the case of parallel heads, the speed of feed motion is relatively modest and therefore the ribbon is not subjected to excessive mechanical stresses. Under those conditions, it is possible for the thermotransferable coating to be formulated in such a way as to give the maximum definition of dots transferred. In the case of a series-parallel head in which the movement is an oscillatory movement and the printing step takes place in a serial mode, in contrast, increased mechanical strength is required from the carrier of the ribbon, and increased sensitivity to heat on the part of the thermotransferable coating, so as to guarantee adequate printing rates. Those limitations are further accentuated in the case of serial heads.

The examples of inking mixtures described hereinafter are not to be interpreted as limiting the invention but as being broadly representative thereof whenever pigments and/or colouring agents used are replaced by pigments and/or colouring agents set forth in the example, not being a departure from the scope of the invention.

EXAMPLE 1

120 g of Aliciclica H-satura resin is dissolved in 400 g of toluene, 80 g of Armeen HT is added, in total solution, and 550 g of ligroin (boiling point (BP) 75° to 100° C.) is added. The solution is poured into a 1500 ml steel bowl with 500 ml of glass marbles.

50 g of Fat Black Ht, 6 g of Sandorin 2 GLS Blue, 16 g of Graftolo BP Ruby and 6 g of Graftolo GXS Yellow are added to the bowl. The addition of the three primary colours imparts a more intense shade to the black, by virtue of the synthesis of the three colours.

The bowl is set milling for 76 hours. After the milling operation, the glass marbles are separated and the ink is coated in a spreading machine over a mylar carrier which is 8μ in thickness.

The ribbon produced permits good quality printing at 80 characters/sec.

EXAMPLE 2

112 g of Unirez 3300 and 98 g of paraffin (MP 60° C.) are dissolved in 500 g of toluene and 550 g of ligron (BP 75° to 100° C.) in the hot state (50° C.).

The solution produced is poured into a 1500 ml steel bowl with 500 ml of glass marbles, and 50 g of Fat Black and 20 g of Carbon Black Raven 1200 (trademark of Cabot Co.) is added to the bowl. The bowl is set milling for 76 hours. After the milling operation, the glass marbles are separated off and 4μ of ink is spread over a mylar carrier which is 8μ in thickness. The black ribbon produced permits good quality printing at up to 70 characters/sec.

EXAMPLE 3

120 g of Dertoline SG, 40 g of Pergamon wax and 40 g of beeswax are dissolved in 500 g of toluene and 550 g of ligroin (BP 75° to 100° C.) in a hot state at about 50° C. The hot solution is poured into a 1500 ml steel bowl with 500 ml of glass marbles. 70 g of Graftolo BP Ruby is added to the bowl.

The bowl is set grinding for 76 hours. After the grinding operation, the glass marbles are separated off and the ink is spread over mylar which is 8μ in thickness. The red ribbon produced permits good quality printing at up to 90 characters/sec.

EXAMPLE 4

120 g of resin 12B715 (Lawter Chemicals N.V.) and 80 g of Micro 60/63 are dissolved in 500 g of toluene and 550 g of ligroin (BP 75° to 100° C.) in a hot condition (about 50° C.). The solution is poured into a 1500 ml steel bowl with 50 ml of glass marbles. 70 g of Sandorin 2GLS Blue is added. The contents of the bowl are milled for 76 hours, at the end of which the ink is separated, to be spread over a mylar carrier which is 8μ in thickness. The blue ribbon which is produced in that way has similar qualities to those of the ribbon described in Example 3.

EXAMPLE 5

120 g of normal ester rosin, 40 g of beeswax and 40 g of paraffin (MP 60° C.) are dissolved in 500 g of toluene and 550 g of ligroin (BP 75° to 100° C.) in a hot condition (at about 50° C.). The solution is then poured into a 1500 ml bowl, with 500 ml of glass marbles. 70 g of Graftolo GXS Yellow is then added to the bowl. The contents of the bowl are milled for 76 hours. At the end of that operation, the ink produced is separated and spread in a spreading machine on a mylar carrier which is 8μ in thickness, in the form of a layer of dry ink which is 4μ in thickness. The ribbon has similar characteristics to those of Examples 3 and 4.

I claim:

1. A heat-sensitive inked element for high-speed dot printing machine comprising a plastics material base carrier having a thickness of from about 5 to about 15 microns covered on one side with a dried adherent layer having a thickness of from about 2 to about 6 microns, said layer formed of a mixture which is transferable to a printing carrier when subjected to heat and pressure, the mixture comprising a pigment and/or colouring agent and a binder consisting of a blend of 53 to 60 percent by weight thermoplastic resins selected from the group consisting of alicyclic, colophane and rosin based non-polymeric resins and correspondingly 47 to 40 percent by weight of a wax selected from the group consisting of natural waxes, synthetic waxes and mixtures thereof with a melting point of between 60° and 80° C., wherein the resins and wax are selected so as to be compatible with each other and to provide a melting point for said mixture of between 60° C. and 80° C. and a melt viscosity for said mixture of between 50 and 1,000 cps, said layer being capable of adhering to any printing paper having a roughness between 10 and 100 mil/min by applying a thermal energy not higher than about 10 joule/$cm^2$ and of giving a good quality of printed dots with a definition of up to 10 dot/mm and a printing feed movement of up to 20 cm/sec.

2. An element according to claim 1, wherein the binder comprises three parts of alicyclic H-saturated resin and two parts of hydrogenated tallow amine wax, and the colouring agent comprises Fat Black HT black in a proportion of 25% by weight of binder and mixed with a mixture of the three complementary colours in a proportion of about 56% of the black.

3. An element according to claim 1, wherein the binder comprises a rosin based resin and paraffin in a ratio of about 60/40, and the colouring agent comprises a mixture of Fat Black HT in a proportion of about 24% by weight of the binder and Carbon Black Raven 1200 in a proportion of about 40% of the Fat Black HT.

4. An element according to claim 1, wherein the binder comprises a rosin ester and a microcrystalline paraffinic wax in a ratio of 3 to 2, and the pigment comprises Sandorin 2GLS Blue in an amount substantially equal to the amount of the microcrystalline wax.

5. An element according to claim 1, wherein the binder comprises three parts of colophane based resin and two parts of a mixture of a microcrystalline paraffinic wax and beeswax in equal parts, and the pigment comprises Graftolo BP Ruby in an amount substantially equal to the amount of the waxes.

6. An element according to claim 1, wherein the binder comprises three parts of normal ester resin and two parts of a mixture of paraffin and beeswax in equal parts, and the pigment comprising Graftolo GXS Yellow in an amount substantially equal to the amount of the waxes.

7. An element according to claim 1, wherein the pigment and/or colouring agent comprises a black colouring agent with the addition of a mixture of the three pigments of the three complementary colours cyan, magenta and yellow.

* * * * *